United States Patent [19]

Appleyard et al.

[11] 4,253,896
[45] Mar. 3, 1981

[54] METHOD OF MAINTAINING KEY BETWEEN SILICONE BELT AND VINYL RESIN BLANKET BY APPLYING A CORONA DISCHARGE TO THE BELT

[75] Inventors: Francis J. Appleyard, East Petersburg; George E. Bagley, Lancaster, both of Pa.

[73] Assignee: Armstrong Cork Company, Lancaster, Pa.

[21] Appl. No.: 37,712

[22] Filed: May 10, 1979

[51] Int. Cl.³ .................. B29C 19/02; B32B 31/00; C07C 3/24
[52] U.S. Cl. .................. 156/231; 156/234; 156/238; 156/244.17; 156/247; 156/272; 156/344; 156/380; 264/39; 226/94; 204/168
[58] Field of Search .................. 156/1, 60, 234, 238, 156/244.17, 272, 277, 380, 231, 247, 344; 204/164, 165, 168; 226/5, 94, 170; 271/193, DIG. 2; 264/39, 26

[56] References Cited

U.S. PATENT DOCUMENTS

| 3,323,965 | 6/1967 | Hanle et al. | 156/272 |
| 3,329,549 | 7/1967 | Vilutis | 156/272 |
| 3,546,065 | 12/1967 | Ostermeier | 204/168 |
| 3,584,733 | 6/1971 | Isermann | 271/193 |
| 3,642,362 | 2/1972 | Mueller | 226/94 |

*Primary Examiner*—John T. Goolkasian
*Assistant Examiner*—Lois E. Rodgers

[57] ABSTRACT

A method of causing a vinyl resin blanket to adhere to a silicone belt during removal of a printing transfer sheet by applying a corona discharge to the belt.

5 Claims, 1 Drawing Figure

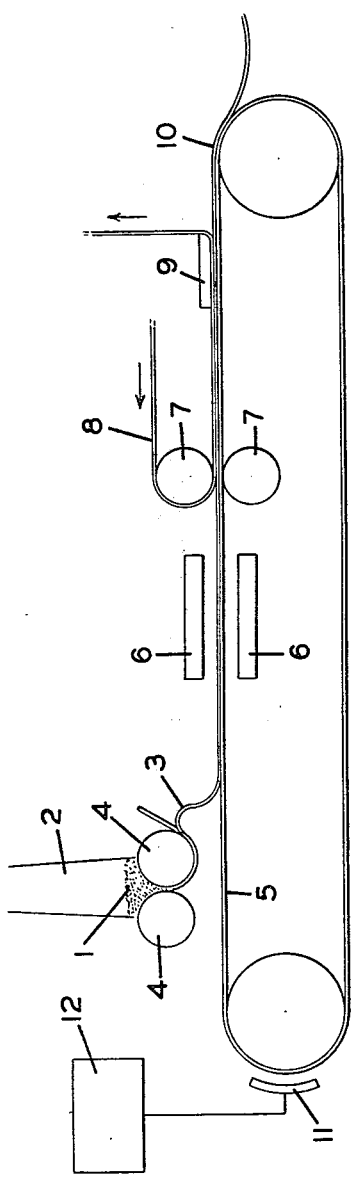

METHOD OF MAINTAINING KEY BETWEEN SILICONE BELT AND VINYL RESIN BLANKET BY APPLYING A CORONA DISCHARGE TO THE BELT

BACKGROUND OF THE INVENTION

1. Field of the Invention

The invention is directed to an improvement in the manufacture of decorative vinyl tiles by preventing separation of a vinyl resin blanket from a silicone belt carrier when a printing transfer sheet is removed from the vinyl resin blanket at elevated temperature.

2. Description of the Prior Art

Prior patents have described processes of adhering sheets to be conveyed on a carrier by using a corona discharge to impart an electrostatic charge to the carrier belt. For example, U.S. Pat. No. 3,584,733 electrostatically charges a polytetrafluoroethylene, and U.S. Pat. No. 3,642,362 uses a corona discharge for electrostatically charging a polyester belt used to transport a paper sheet along with use of a neutralizing corona device.

None of these patents is of any use in solving the problems met with forming a vinyl resin blanket suitable for ultimate cutting into decorative tiles, transporting the formed blanket on a carrier belt to a printing station using transfer printing paper, and subsequently peeling off the printing paper from the vinyl resin blanket while maintaining the blanket in contact with the belt in order that the belt may transport the blanket further in the process for additional steps. Due to the elevated temperature of the system at the point where the printing paper is peeled away from the vinyl resin blanket, there is a strong tendency of the blanket to lift from the carrier belt and follow the used transfer printing paper to its roll-up. Accordingly, there is a need for a method of maintaining the key or adhesion between the carrier belt and the vinyl resin blanket at elevated temperatures at the time when the used printing transfer sheet is peeled off. The present invention solves this problem.

SUMMARY OF THE INVENTION

The method of the present invention calls for the use of a reinforced silicone rubber carrier belt as a means for conveying a vinyl resin blanket along a processing line in order to ultimately form decorative vinyl tiles, usually measuring about 12×12 inches. A corona discharge is applied to the reinforced silicone belt. The corona discharge apparently alters the chemical composition of the surface of the silicone belt and puts the surface in condition to better key the bottom surface of the vinyl resin blanket at a time when the blanket is subjected to an upward force as the printing transfer sheet is peeled from the top of the blanket. The corona discharge may also scour a residual, exceedingly thin film of plasticizer from the surface of the belt. The plasticizer, usually butyl benzyl phthalate migrates through the blanket to the belt during the heating cycles to which the blanket is subjected. This possible removal of trace amounts of plasticizer from the surface of the silicone belt is considered part of the chemical modification of the surface of the belt by the corona discharge.

BRIEF DESCRIPTION OF THE DRAWING

The drawing is a schematic diagram in simplified form of the method of the present invention.

DESCRIPTION OF THE PREFERRED EMBODIMENT

Referring to the drawing, a vinyl mix 1 is dumped into the hopper 2. The vinyl mix will comprise polyvinyl chloride, a plasticizer therefore such as butyl benzyl phthalate, any desired fillers such as coarse and finely divided calcium carbonate, pigments if desired, and the usual heat and light stabilizers for the vinyl resin. The vinyl resin may consist of polyvinyl chloride or it may consist of a vinyl chloride-vinyl acetate copolymer, or it may consist of mixtures of these. Any of the usual vinyl resin plasticizers may be used, and frequently mixtures of plasticizers will be utilized in order to obtain the desired properties in the final product.

The vinyl mix 1 is formed into a blanket 3 by the calender rolls 4. The calender rolls 4 are usually hot, and may be maintained at a temperature above 200° F. The vinyl resin-containing blanket is dropped onto the reinforced silicone belt 5 and transported to a heating station between the heaters 6. Note that the heaters 6 heat both the blanket 3 and the silicone belt 5. The heated system is then transported to the printing station where the rolls 7 cooperate to press the transfer paper 8 onto the surface of the vinyl blanket 3. The transfer paper 8 is a resin coated cellulosic sheet carrying on one surface thereof the printed desirable design to be imparted to the vinyl blanket 3. The rolls 7 press the printing transfer sheet 8 against the top surface of the blanket 3 in order that the printing on the transfer paper 8 be transferred from the paper 8 to the upper surface of the vinyl blanket 3. The temperature at which this transfer printing is carried out is usually in the range of about 285° F. to about 315° F.

Subsequent to the printing operation, the system passes to a sheet stripping operation 9 at which the used printing sheet is peeled off the surface of the vinyl blanket 3 and passed to a windup, not shown. The printed vinyl resin blanket 10 may then be processed further in any desired manner. Often, the printed vinyl resin blanket 10 will pass to an additional heating station to prepare it for the application of one or more clear wear coats. On cooling, the coated, printed, blanket may be cut into a suitable size for use as decorative tiles, particularly as floor tiles.

The corona discharge is obtained by utilizing devices available in commerce. The corona discharge is an electrical discharge used to activate a chemical reaction. In the present process, the corona discharge will normaly be used at atmospheric pressure in air. The blue glow normally seen at a corona discharge will be present and simply represents ionized air in that region. In the present method, it has been convenient to use two corona discharge units having a rated power output of 1500 watts each, although such units are often actually run at significantly less than their rated power. Additionally, in the present method, it has not been found necessary to run the corona discharge units continuously during the entire operation. The chemical modification of the surface of the reinforced silicone belt once achieved will maintain its integrity for a period of time ranging from a few minutes to a few hours. However, there will come a time when the vinyl blanket will begin to lift from the silicone belt as the transfer sheet is peeled off, thus indicating the need for renewed application of the corona discharge.

The reinforced silicone belt is used because it best resists variations in size as it is subjected to both temperature and physical stresses as it transports the vinyl blanket. The silicone itself is made from poly(dimethyl siloxanes). The elastomeric silicone rubber used in its manufacture may contain modifying groups such as phenyl, vinyl, or other groups. The reinforcing means of the silicone rubber belt will normally be glass filaments, although other yarns and fibers capable of withstanding the temperature and physical stresses may be used. A typical belt that may be used is a P-570T glass fiber reinforced silicone rubber belt available from Permacel Division of Johnson and Johnson.

The corona discharge unit 11 is powered by unit 12 and may be applied to the surface of the silicone belt at any convenient place. The unit 11 is conventional in the art. A particular corona discharge device that has been used is the model RS16 Corona Surface Treator from EN1 Power Systems, Inc. This is a high frequency (about 32 kHz) AC generator spaced about 50 mils from the belt.

What is claimed is:

1. In the manufacture of decorative plastic tile by forming a decorative or plain vinyl resin blanket, depositing said blanket on a carrier belt, printing said blanket on said belt by pressing a transfer printing sheet against one face of said blanket, removing said transfer sheet from said blanket, and cutting the printed blanket into tiles, the improved method of maintaining adherence of said blanket to said belt while removing said transfer sheet comprising, depositing said blanket on a carrier belt consisting of a reinforced silicone rubber belt, and applying a corona discharge to the surface of said belt at atmospheric pressure prior to the application of the blanket, whereby the surface characteristics of said belt are altered to maintain adherence of said blanket to said belt during transfer sheet removal.

2. The method according to claim 1 in which said corona discharge is applied at atmospheric pressure in air.

3. The method according to claim 1 in which said blanket comprises poly (vinyl chloride).

4. The method according to claim 1 in which said blanket comprises a vinyl chloride-vinyl acetate copolymer.

5. The method according to claim 1 in which the corona discharge is not continuously applied to the surface of the belt.

* * * * *